United States Patent
Suezawa et al.

(10) Patent No.: US 6,450,528 B1
(45) Date of Patent: Sep. 17, 2002

(54) VEHICLE SEAT HOUSING AN AIRBAG DEVICE

(75) Inventors: Yasunori Suezawa, Nishikamo-gun; Hirokazu Makino, Kasugai, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/407,953

(22) Filed: Sep. 28, 1999

(30) Foreign Application Priority Data

Oct. 1, 1998 (JP) ............................... 10-280024

(51) Int. Cl.[7] .......................... B60R 21/22; B60R 21/16
(52) U.S. Cl. ........................................... 280/730.2
(58) Field of Search ........................ 280/730.2, 730.1, 280/728.1; 297/216.13, 216.1

(56) References Cited

U.S. PATENT DOCUMENTS

| | | | |
|---|---|---|---|
| 5,498,030 A | | 3/1996 | Hill et al. |
| 5,553,887 A | | 9/1996 | Karlow et al. |
| 5,630,615 A | | 5/1997 | Miesik |
| 5,639,111 A | | 6/1997 | Spencer et al. |
| 5,651,582 A | * | 7/1997 | Nakano ............. 280/730.2 |
| 5,678,853 A | | 10/1997 | Maly |
| 5,687,987 A | | 11/1997 | Spencer et al. |
| 5,749,597 A | | 5/1998 | Saderholm |
| 5,752,714 A | | 5/1998 | Pripps et al. |
| 5,762,363 A | * | 6/1998 | Brown et al. ......... 280/730.2 |
| 5,785,350 A | * | 7/1998 | Inoue et al. ......... 280/730.2 |
| 5,799,971 A | * | 9/1998 | Asada ................ 280/730.2 |
| 5,816,610 A | | 10/1998 | Higashiura et al. |
| 5,829,779 A | * | 11/1998 | Nakashima et al. .... 280/730.2 |
| 5,845,932 A | * | 12/1998 | Kimura et al. ........ 280/730.2 |
| 5,851,024 A | | 12/1998 | Satani et al. |
| 5,863,063 A | * | 1/1999 | Harrell .............. 280/730.2 |
| 5,893,579 A | | 4/1999 | Kimura et al. |
| 5,924,724 A | * | 7/1999 | Nakamura et al. ..... 280/730.2 |
| 5,927,749 A | * | 7/1999 | Homier et al. ........ 280/730.2 |
| 5,938,232 A | * | 8/1999 | Kalandek et al. ...... 280/730.2 |
| 5,944,341 A | * | 8/1999 | Kimura et al. ........ 280/730.2 |
| 5,967,546 A | * | 10/1999 | Homier et al. ........ 280/730.2 |
| 5,988,674 A | * | 11/1999 | Kimura et al. ........ 280/730.2 |
| 6,003,938 A | * | 12/1999 | Lachat et al. ........ 280/730.2 |
| 6,045,151 A | * | 4/2000 | Wu .................. 280/730.2 |
| 6,062,593 A | * | 5/2000 | Satani et al. ........ 280/730.2 |
| 6,155,593 A | * | 12/2000 | Kimura et al. ........ 280/730.2 |
| 6,206,466 B1 | * | 3/2001 | Komatsu ............. 280/730.2 |
| 6,213,498 B1 | * | 4/2001 | Ghalambor et al. .... 280/730.2 |
| 6,213,550 B1 | * | 4/2001 | Yoshida et al. ....... 280/730.2 |
| 6,254,122 B1 | * | 7/2001 | Wu et al. ............ 280/730.2 |

FOREIGN PATENT DOCUMENTS

| | | | |
|---|---|---|---|
| EP | 000818365 A1 | * 1/1998 | ........... B60R/21/22 |
| JP | 8-258661 | 10/1996 | |
| JP | 9-240413 | 9/1997 | |
| JP | 10-76904 | 3/1998 | |
| JP | 10-100847 | 4/1998 | |
| JP | 10-166987 | 6/1998 | |

* cited by examiner

Primary Examiner—Paul N. Dickson
Assistant Examiner—Joselynn Y. Sliteris
(74) Attorney, Agent, or Firm—Oliff & Berridge, PLC

(57) ABSTRACT

A resin press felt, which is harder than a main portion of a seat pad, deforms by expansion pressure of an airbag pouch body and guides the airbag pouch body in a predetermined direction. The felt pad is disposed on a front side extending portion of a felt that extends toward a door from a flange of a side frame. A door side portion of the resin press felt is in front of the airbag pouch body, and an inside portion of the resin press felt in the vehicle width direction overlaps the flange of the side frame by a predetermined amount.

17 Claims, 10 Drawing Sheets

VEHICLE SEAT HOUSING AN AIRBAG DEVICE

The disclosure of Japanese Patent Application No. HEI 10-280024 filed on Oct. 1, 1998 including the specification, drawings and abstract is incorporated herein by reference.

BACKGROUND OF THE INVENTION

1. Field of the Invention

This invention relates to a vehicle seat housing an airbag device, and particularly to a vehicle seat housing an airbag device on a side portion of a seat back frame.

2. Description of the Related Art

Conventionally, Japanese Laid-Open Patent Application No. HEI 10-76904 is known as an example of a vehicle seat housing an air bag device on a side portion of a seat back frame.

As shown in FIG. 10, in a vehicle seat housing this type of airbag device, a pad 102 of a seat back 100 receives expansion pressure of an airbag pouch body 104. A cut-in groove portion 106 is provided as a pad expansion commencement point setting portion which becomes the activation point portion at which the pad 102 begins expanding and breaking. This cut-in groove portion 106 is disposed at a position that is offset from an airbag pouch body expansion direction in which the airbag pouch body 104 directly contacts a seat interior surface of the pad 102. Furthermore, this cut-in groove portion 106 is disposed on the side of a line 112 connecting the top portion of a side support 100A and an axis of an inflator 110 within an airbag device 108 that is opposite the side on which a center of the seat is located.

However, in a vehicle seat housing this type of airbag device, if the pad 102 is formed to be soft, in order to improve sitting comfort, when the airbag pouch body 104 is expanded and developed, the pad 102 can easily be expanded into a balloon state. As a result, energy is lost with respect to development capability of the airbag pouch body 104 during the process until the airbag pouch body 104 breaks the pad 102 and a surface covering 114. Therefore, expansion capability of the airbag pouch body 104 is considered to be unstable.

SUMMARY OF THE INVENTION

An object of this invention is to obtain a vehicle seat housing an airbag device which can control energy loss due to deformation of a seat pad during expansion.

In a first embodiment of this invention, a vehicle seat housing an airbag, device which is fixed to a door side portion of a seat back side frame in a concave portion of a seat pad which is open to a rear side of the vehicle and covered by a seat surface covering has a guide means which is disposed at an inward side of the front surface of the scat pad. The guide means is positioned on a side of a plane connecting an axis of an inflator of the airbag device and a breakage sewn portion of the seat surface covering that is closer to a center of the seat, at an airbag pouch body expansion area. The guide means is harder than a main portion of the seat pad. The guide means is deformed by expansion pressure of the airbag pouch body and guides an airbag pouch body in a predetermined direction.

Therefore, by the guide means which is additionally provided on the seat pad, with respect to the initial expansion of the airbag pouch body, the expansion direction of the airbag pouch body is deflected by the rigid effect and the expansion can be realized that aims at a breakage sewn portion of the seat surface covering. As a result, energy loss due to deformation of a seat pad during an airbag pouch body expansion can be controlled, pressure can be focused at a breakage sewn portion, and this can be instantly broken, so expansion speed of the airbag pouch body can be improved. In addition, along with the expansion of the airbag pouch body, the guide means is deformed by expansion pressure of the airbag pouch body and guides the airbag pouch body in a predetermined direction, so completion time of the airbag pouch body expansion can be speeded up.

The guide means can be structured by resin press felt. By using resin press felt for the guide means, manufacturing can be easily performed and cost can be lower.

The guide means can be structured by a harder pad than a main portion of the [seat] pad. By using a hard pad for a guide means, manufacturing can be easily performed and cost can be lower.

The guide means extends to an inward position in a seat width direction which overlaps a front end portion of the seat back side frame by a predetermined amount. By so doing, the airbag pouch body to be expanded cannot be easily inserted between the front end portion of the seat back side frame and the seat pad, so the expansion direction of the airbag pouch body can be effectively adjusted.

In a second embodiment of the invention, a vehicle seat housing an airbag device which is fixed to a door side portion of a seat back side frame in a concave portion of a seat pad which is open to a rear side of the vehicle and covered by a seat surface covering has a guide means which is disposed on the seat back side frame. The guide means is positioned on a side of a plane connecting an axis of an inflator of the airbag device and a breakage sewn portion of the seat surface covering that is closer to a center of the seat, at an airbag pouch body expansion area. The guide means is harder than a main portion of the seat pad. The guide means is deformed by expansion pressure of the airbag pouch body and guides an airbag pouch body in a predetermined direction.

Therefore, by the guide means which is provided on the seat back side frame, with respect to the initial expansion of the airbag pouch body, the expansion direction of tile airbag pouch body is deflected by the rigid effect and the expansion can be realized that aims at a breakage sewn portion of the seat surface covering. As a result, energy loss due to deformation of a seat pad during an airbag pouch body expansion can be controlled, pressure can be focused at a breakage sewn portion, and this can be instantly broken, so expansion speed of the airbag pouch body can be improved. In addition, along with the expansion of the airbag pouch body, the guide means is deformed by expansion pressure of the airbag pouch body and guides the airbag pouch body in a predetermined direction, so completion time of the airbag pouch body expansion can be speeded up.

The guide means can be structured by a deformable plate, one end portion of which is fixed to a front end portion of a seat back frame.

Furthermore, the guide means can be structured by a deformable plate, one end portion of which is fixed to a side surface portion of the seat back frame.

By so doing, the expansion direction of the airbag pouch body can be easily adjusted by the material and plate thickness of the plate.

In a third embodiment of this invention, a vehicle seat housing an airbag device which is fixed to a door side portion of a seat back side frame in a concave portion of a seat pad which is open to a rear side of the vehicle and covered by a seat surface covering has a hard pad portion which forms part of the seat pad. The hard pad portion is positioned on a side of a plane connecting an axis of an inflator of the airbag device and a breakage sewn portion of the seat surface covering that is closer to the center of the seat, at an airbag pouch body expansion area. The hard pad portion is harder than a main portion of the pad.

Therefore, by a guide means which is provided on the seat pad, with respect to the initial expansion of the airbag pouch body, the expansion direction of the airbag pouch body is deflected by the rigid effect and expansion can be realized that is aimed at a breakage sewn portion of the seat surface covering. As a result, energy loss due to deformation of the seat pad during airbag pouch body expansion can be prevented, pressure can be focused on a breakage sewn portion, and this can be instantly broken, so expansion speed of the airbag pouch body can be improved. In addition, along with the expansion of the airbag pouch body, the hard pad portion positioned at the airbag pouch body expansion area is deformed by expansion pressure of the airbag pouch body and guides the airbag pouch body in a predetermined direction, so completion time of the airbag pouch body expansion can be speeded up.

In the first through third embodiments, it is possible to dispose a supplemental guide means that is deformable by expansion pressure of the airbag pouch body, and which is harder than a main portion of the pad, on an inward surface facing a door side portion of the airbag device in the seat pad. By so doing, the expansion direction of the airbag pouch body can be effectively adjusted by the guide means and the supplemental guide means. When a caseless side airbag device is used, because the airbag device itself is soft, there is a concern that seat rigidness is insufficient when it is externally touched if the seat side portion of the seat pad is thin. However, rigidness is not lost because the supplemental guide means is set.

The supplemental guide means extends to a rear position which overlaps a protector, which is fixed to a door side portion of the seat back side frame and maintains an expansion space of the airbag pouch body during a side collision, by a predetermined amount.

Therefore, interference between a seat pad and an edge of the protector can be prevented by the supplemental guide means, and damage of the pad by the edge of the protector can be prevented.

DETAILED DESCRIPTION OF THE PREFERRED EMBODIMENTS

A first embodiment of a vehicle seat housing airbag, device of this invention is explained in accordance with FIGS. 1–5.

Furthermore, an arrow UP in the figures shows an upward direction of a vehicle, an arrow FR in the figures shows a forward direction of a vehicle, and an arrow IN in the figures shows an inward-facing direction of a vehicle.

Figure 5:
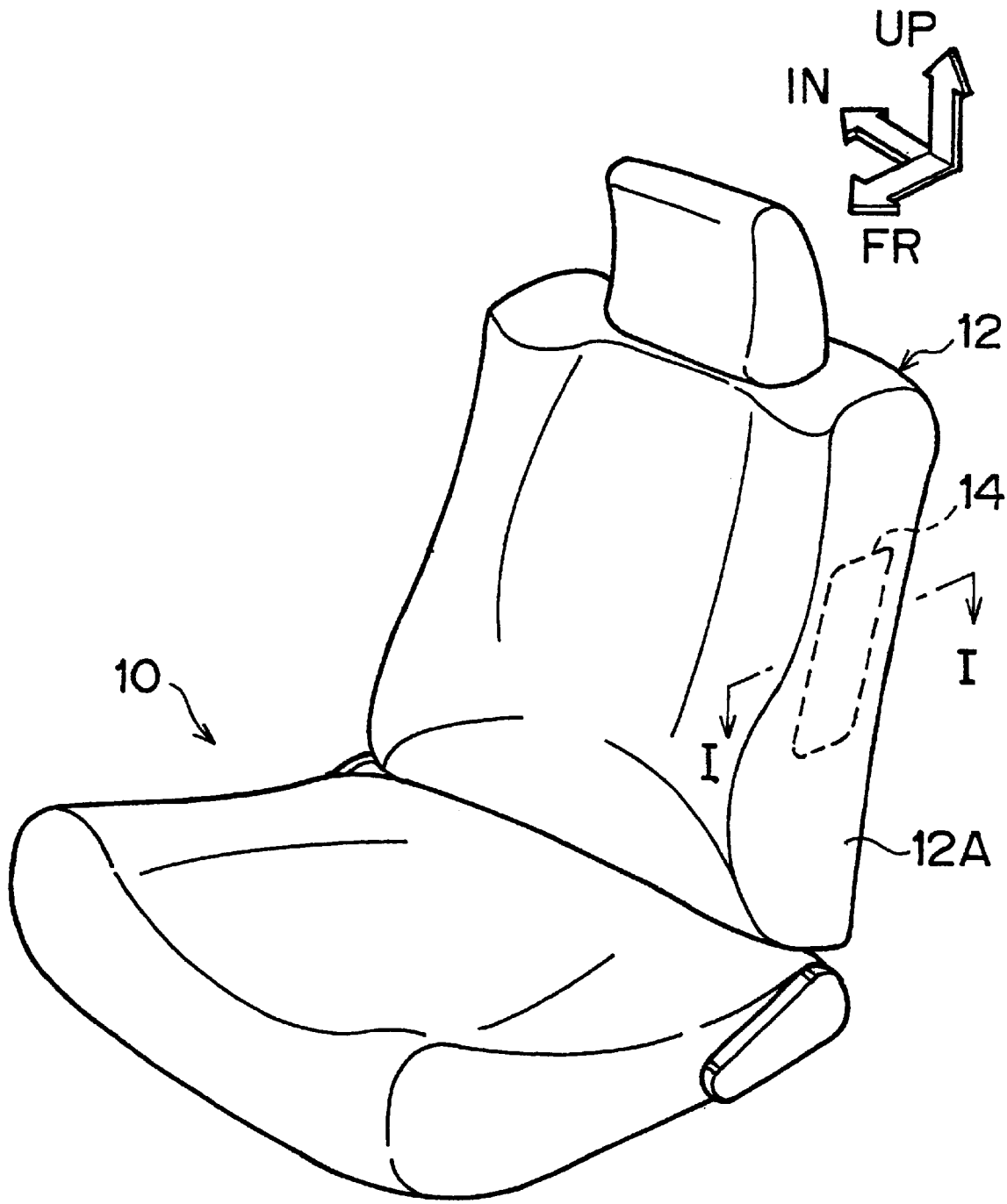
FIG. 5 is a perspective view from a forward diagonal direction showing a vehicle seat housing an airbag device related to a first embodiment of this invention.

As shown in FIG. 5, in a seat structure provided with a side-collision airbag device of this embodiment, an airbag device 14 which extends in an up-and-down direction is disposed within a side portion 12A formed in a door side portion of a seat back 12 of a seat 10.

Figure 3:
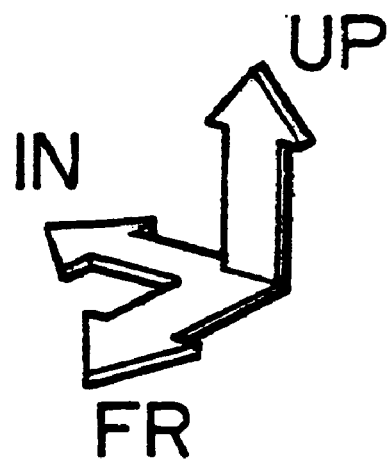
FIG. 3 is a perspective view from a forward diagonal direction showing a seat back frame of a vehicle seat housing an airbag device related to a first embodiment of this invention.
Figure 3:
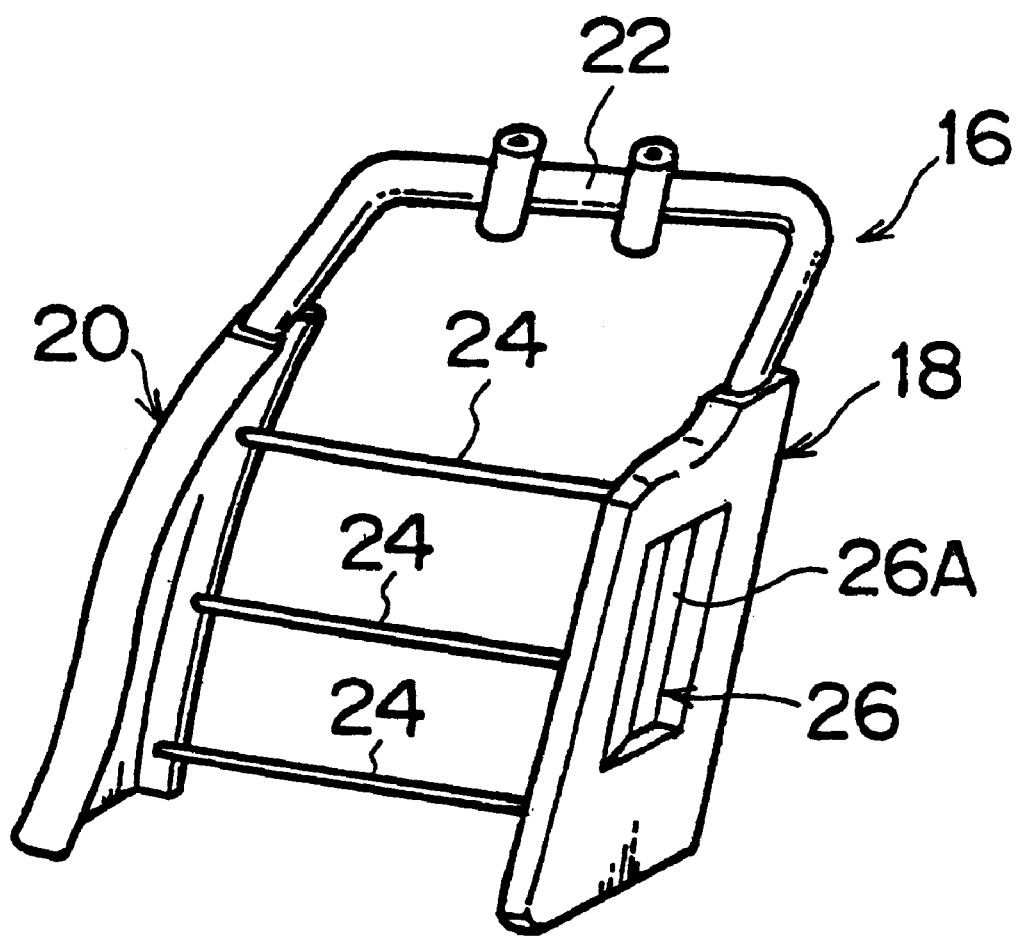
Figure 4:
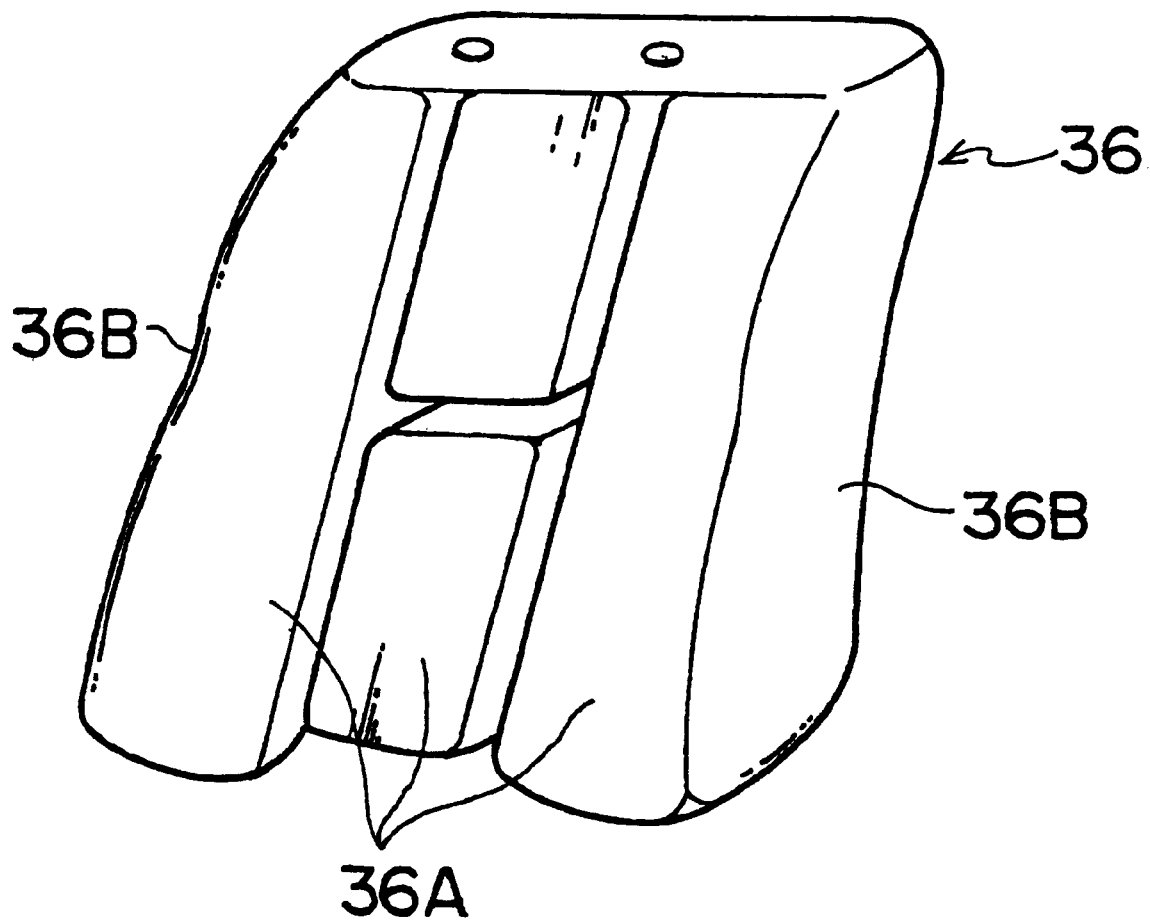
FIG. 4 is a perspective view from a forward diagonal direction showing a seat pad of a vehicle seat housing an airbag device related to a first embodiment of this invention.

As shown in FIG. 3, a seat back frame 16 is provided with a pair of right and left side frames 18 and 20 which are strengthening members. The side frames 18 and 20 are disposed substantially parallel to a front-to-rear direction of the seat. Furthermore, respective top end portions of the pair of right and left side frames 18 and 20 are mutually connected by an upper frame 22 made from a pipe material which is bent into a U shape. Additionally, seat backside edge portions of the pair of right and left side frames 18 and 20 are mutually connected by a plurality of seat wires 24. An airbag device, which will be discussed later, is fixed to the side frame 18, which is the side frame closest to a door. After that, a seat pad 36, shown in FIG. 4, covers the seat frame 16 from an upward direction. A seat surface covering 50, which will be discussed later, covers the outside of the seat pad 36, thus completing the structure of a seat 10 of this embodiment.

Figure 1:
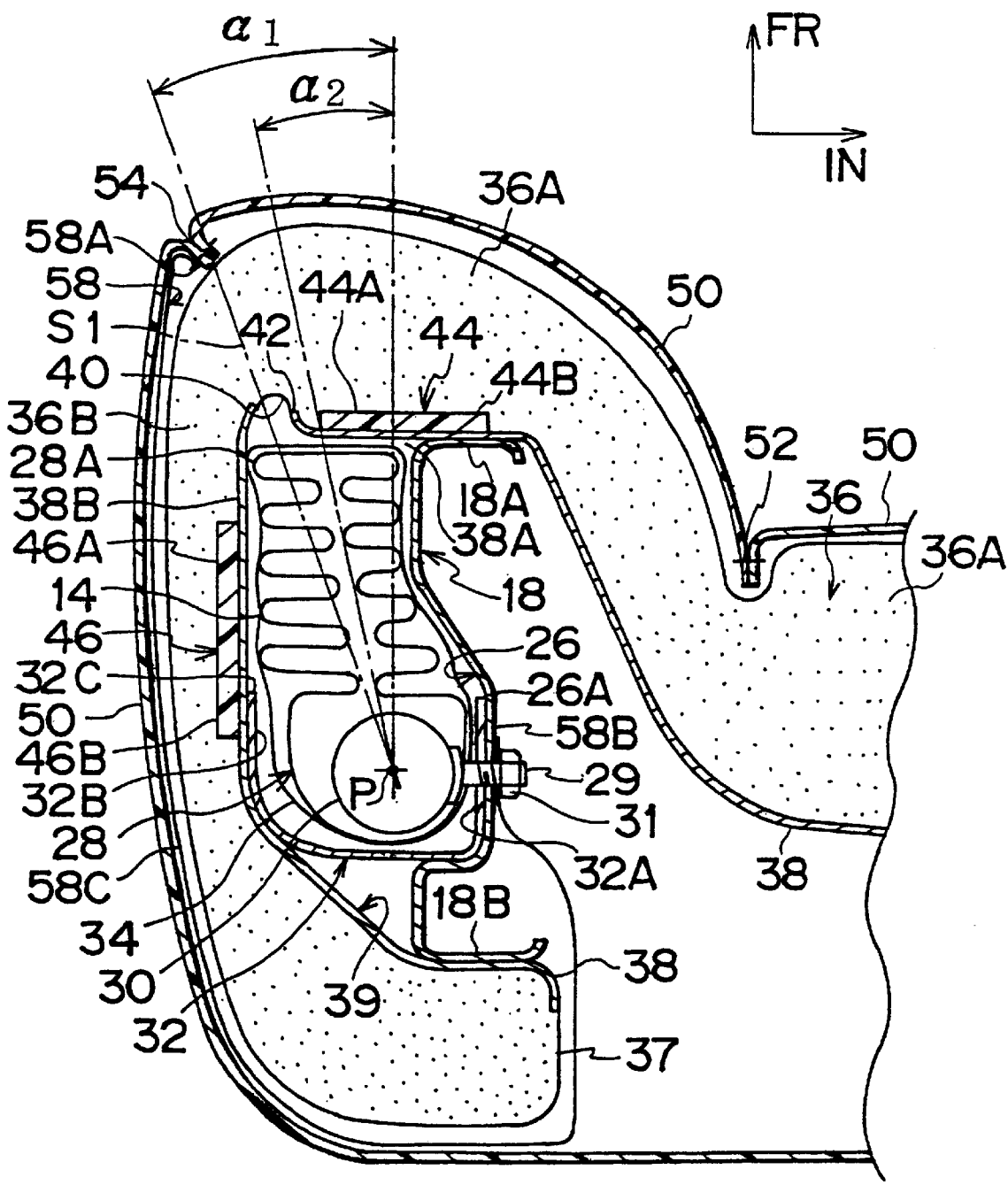
FIG. 1 is a blown-apart cross-sectional view along line I—I of FIG. 5.

As shown in FIG. 1, a flange 18A is formed facing an interior of the seat at a front end portion of the side frame 18, which is the side frame closest to a side door of a vehicle (hereafter referred to as the door side), and a flange 18B is formed facing the interior of the seat at a rear end portion of the side frame IS. In an intermediate portion in a front-to-rear direction of the side frame 18, an airbag, device housing, concave portion 26 which is hollowed toward an inward direction of the seat is formed along an up-and-down direction of the seat. A rear portion of the airbag device housing concave portion 26 is further hollowed toward the inward direction of the seat and is an inflator housing portion 26A.

The airbag device housing concave portion 26 and a portion forward and thereof house a folded airbag pouch body 28. In the inflator housing portion 26A, a cylindrical inflator 30 is housed and fixed to the side frame 18 by upper and lower bolts 29, which protrude from a circumferential portion of the inflator 30 toward an inward direction of the vehicle width, and nuts 31 engaging the bolts 29. Additionally, the inflator 30 is disposed within the airbag pouch body 28, and the airbag pouch body 28 is expanded substantially in a forward direction of the vehicle by gas emitted from the inflator 30.

At the circumferential portion of the inflator 30, a protector 32 is disposed outside of the airbag pouch body 28 and an expansion space of the airbag pouch body 28 during side collision is securely maintained. Furthermore, a cross-sectional shape of the protector 32, as seen from an up-and-down direction, is a U shape with an open portion of the U facing a front direction, and a wall portion 32A facing inward in the vehicle width direction is welded to the inflator housing portion 26A.

The airbag pouch body 28 is maintained in a folded state by a wrapping member 34 made from a cloth bag or the like, and when the airbag pouch body 28 is expanded, the wrapping member 34 can be easily broken.

The seat pad 36 which covers the seat back frame is provided with an open portion 37 on a side facing the rear of the vehicle, and the airbag device 14 is housed in a concave portion 39 formed in a side facing the door. Additionally, inside of the seat pad 36, a felt 38 is disposed on a surface of the seat pad 36 that faces the interior of the seat. A concave portion 40 which is hollowed in a substantially frontward direction is formed along a substantially up-and-down direction in a portion of the seat pad 36 which is near the door side front end portion 28A of the airbag pouch body 28 in a folded state. At this concave portion 40, a cut-out 42 extending in a substantially up-and-down direction is formed in the felt 38, and when the airbag pouch body 28 is expanded, the seat pad 36 can be easily broken along the concave portion 40.

Figure 2:
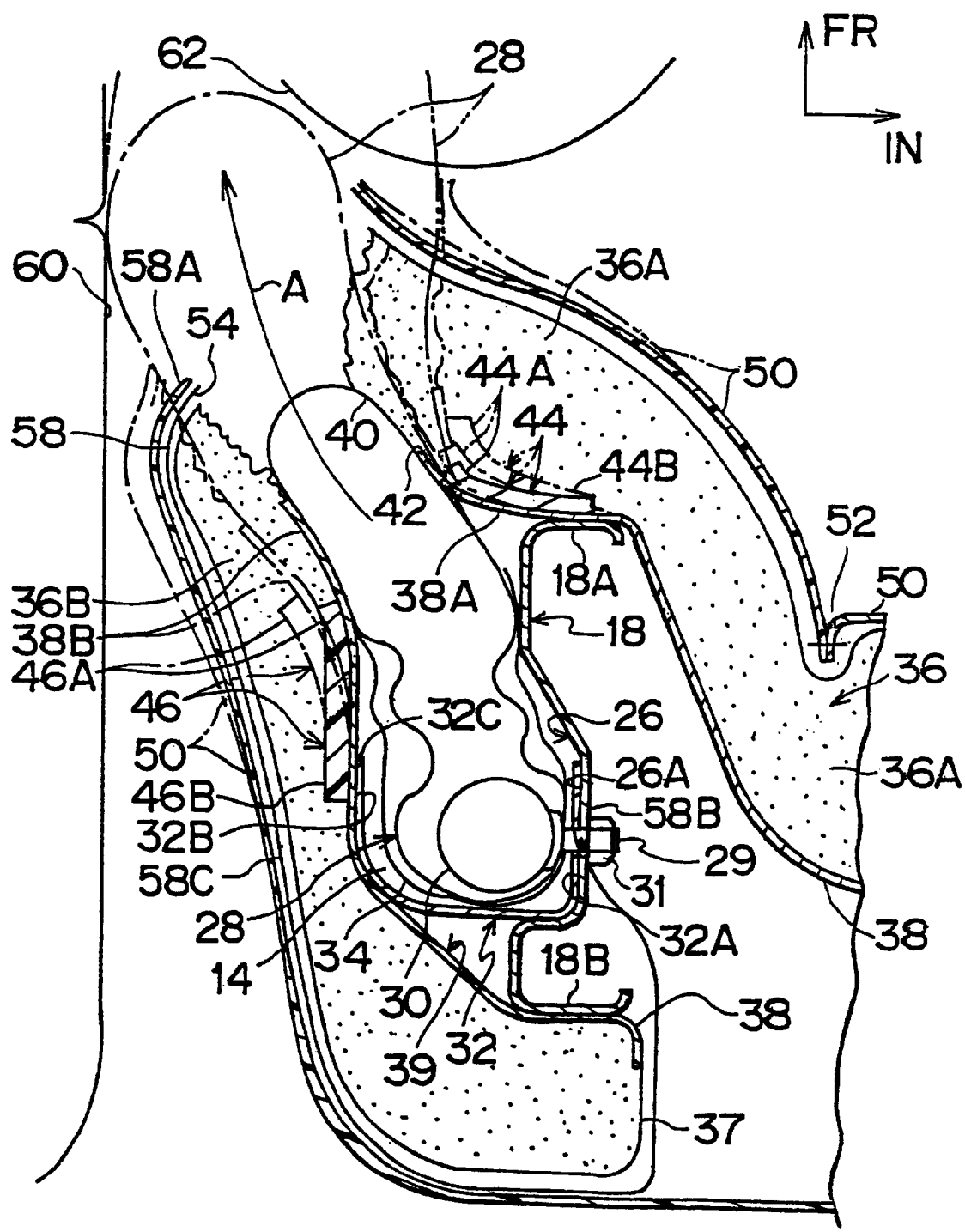
FIG. 2 is an operational explanatory diagram of a vehicle seat housing an airbag device related to a first embodiment of this invention.

In a front side extending portion 38A of the felt 38 that extends toward the door from the flange 18A of the side frame 18 a resin press felt 44 is disposed as a guide means which is harder than the main portion 36A of the seat pad 36 and which deforms as shown in FIG. 2 by expansion pressure of the airbag pouch body 28 and guides the airbag pouch body 28 in a predetermined direction (the arrow A direction of FIG. 2). The resin press felt 44 is inserted between the seat pad 36 and the felt 38. Furthermore, resin press felt is a felt made by pressing together resin material such as resin waste material and impregnating resin into this pressed felt and solidifying it.

That is, as shown in FIG. 1, the resin press felt 44 is disposed on the side of a plane S1 connecting the axis P of the inflator 30 and the breakage sewn portion 54 of the seat surface covering 50, which will be discussed later, that is closer to the center of the seat (right side in FIG. 1) and at the inside surface of the seat pad 36 positioned at the expansion area of the airbag pouch body 28.

Furthermore, the door side portion 44A of the resin press felt 44 is in front of the airbag pouch body 28, and the vehicle width direction inside portion 44B of the resin press felt 44 overlaps the flange 18A of the side frame 18 by a predetermined amount.

On a side extending, portion 38B of the felt 38 that extends from the door side wall portion 32B of the protector 32 toward the front of the vehicle, a resin press felt 46, which is harder than a side portion 36B of the main portion of the seat pad 36, is disposed as a supplemental guide means, and is deformed as shown in FIG. 2 by expansion pressure of the airbag pouch body 28 and guides the airbag pouch body 28 in a predetermined direction (the arrow A direction of FIG. 2). The resin press felt 46 is inserted between the seat pad 36 and the felt 38. Furthermore, the vehicle front side portion 46A of the resin press felt 46 is at the door side of the airbag pouch body 28, and the vehicle back side portion 46B of the resin press felt 46 is overlapped by the door side wall portion 32B of the protector 32 by a predetermined amount.

The outside of the seat pad 36 is covered by the seat surface covering 50. With respect to the seat surface covering 50, several sheets of surface covering are sewn together at sewn portions 52, 54, and the like. When the airbag pouch body 28 is expanded, the sewn portion 54 facing the front end portion of the side portion 36B of the seat pad 36 acts as a breakage sewn portion which can be easily broken. Additionally, the sewn portion 54 is connected to one end portion 58A of a stress cloth 58, and in the inflator housing portion 26A of the side frame 18, other end portion 58B of the stress cloth 58 is fastened by the inflator fixing bolts 29. Furthermore, an intermediate portion 58C of the stress cloth 58 passes around the door side circumferential portion of the side portion 36B of the seat pad 36, and when the airbag pouch body is expanded, a breakage force effectively acts on the sewn portion 54 through the stress cloth 58.

The following explains the operation of this embodiment.

In a seat structure provided with a side-collision airbag device of this embodiment, when the inflator 30 of the airbag device 14 is operated during side collision, the airbag pouch body 28 is expanded by gas emitted from the inflator 30. At this time, due to the rigid effect of the resin press felts 44 and 46, with respect to the initial expansion of the airbag pouch body 28, as shown in a solid line in FIG. 2, the expansion direction of the airbag pouch body 28 is deflected toward the outside of the vehicle, and expansion in an angle α1 direction (see FIG. 1), which aims at the sewn portion 54 as a breakage sewn portion of the seat surface covering 50, can be realized. As a result, energy loss due to the deformation of the seat pad 36 during the airbag pouch body expansion can be controlled, the pressure can be focused on the sewn portion 54 as a breakage sewn portion, and the expansion speed of the airbag pouch body 28 can be improved because of the instant breakage.

Furthermore, after the sewn portion 54 as a breakage sewn portion is broken, as shown in a dotted line in FIG. 2, the resin press felt 44 is further deformed by expansion pressure of the airbag pouch body 28, and the airbag pouch body expands at an angle α2 (α2<α1) direction (see FIG. 1), which aims between a vehicle main body side portion 60 and a vehicle occupant side portion 62. Therefore, the time until the expansion completion of the airbag pouch body 28, shown in a two-dotted line of FIG. 2, can be speeded up.

Furthermore, in this embodiment, because the resin press felt 44 is used as a guide means and the resin press felt 46 is used as a supplemental guide means, the expansion direction of the airbag pouch body 28 can be effectively adjusted.

Furthermore, in this embodiment, because the guide means is the resin press felt 44 and the supplemental guide means is the resin press felt 46, manufacturing can be easily performed and cost can be lower.

Furthermore, in this embodiment, because the vehicle width direction inside portion 44B of the resin press felt 44 is extended to a position which overlaps the flange 18A of the side frame 18 by a predetermined amount, the airbag pouch body 28 to be expanded cannot be easily inserted between the flange 18A of the side frame 18 and the main portion 36A of the seat pad 36, so the expansion direction of the airbag pouch body 28 can be effectively adjusted.

Additionally, in this embodiment, because tile resin press felt 46 is disposed at a doorward side of the airbag device 14, in the case of a caseless side airbag device, such as in this embodiment, because the airbag device itself is soft, there is a concern that seat rigidness is insufficient when it is externally touched if the side portion 36B of the seat pad 36 is thin, but rigidness is not lost due to the resin press felt 46.

Furthermore, in this embodiment, because the protector 32 is disposed, the expansion space of the airbag pouch body 28 can be securely maintained by the protector 32 during side collision.

Furthermore, in this embodiment, because the vehicle rear side portion 46B of the resin press felt 46 extends to a position which overlaps the door side wall portion 32B of the protector 32 by a predetermined amount, it is possible to prevent the felt 38 and the pad 36 from being damaged by the edge 32C of the protector 32.

Figure 6:
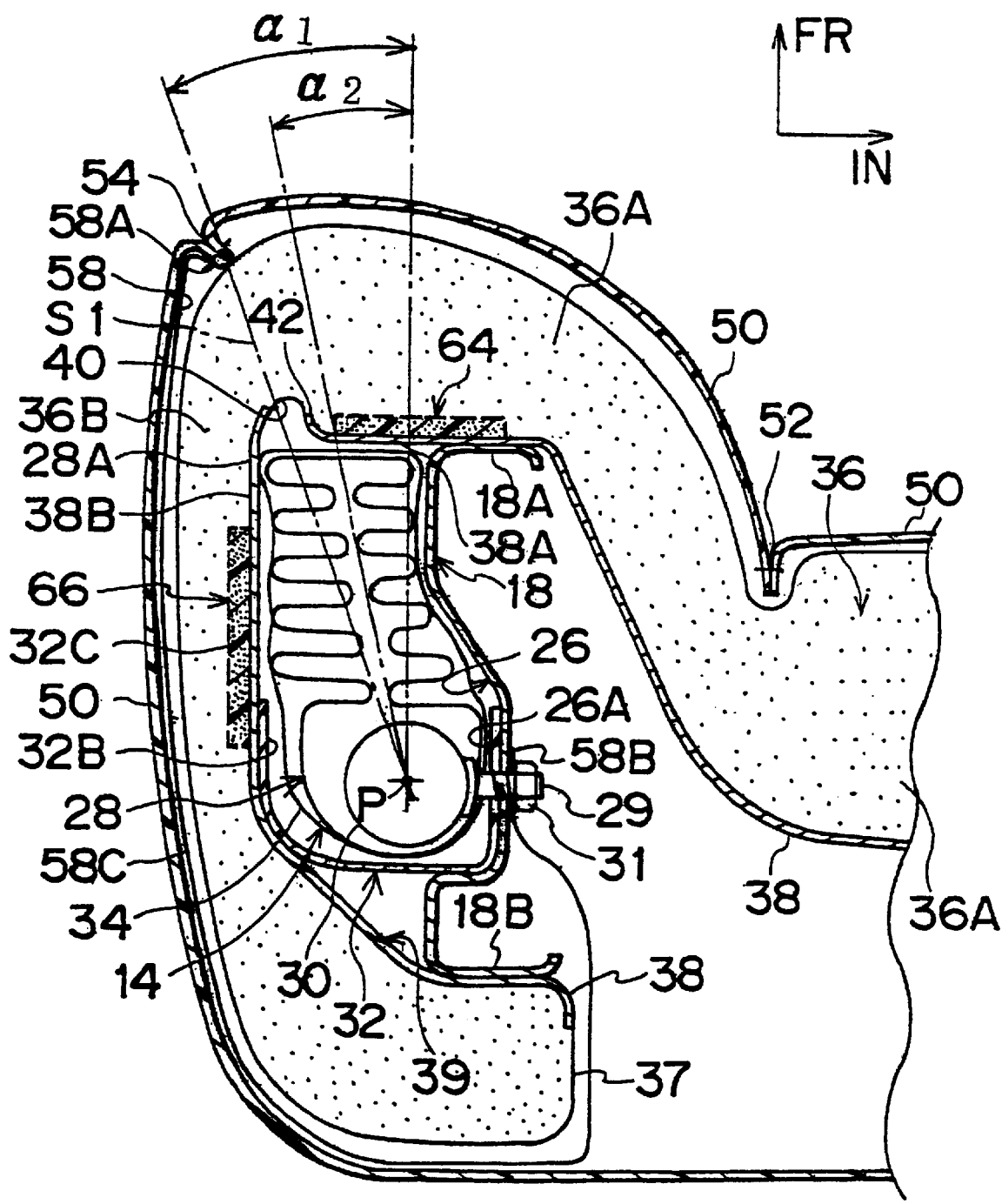
FIG. 6 is a cross-sectional view corresponding to FIG. 1 showing a vehicle seat housing an airbag device related to a second embodiment of this invention.

Next, a second embodiment of the vehicle seat housing an airbag device of this invention is explained in accordance with FIG. 6.

With respect to members that are the same as in the first embodiment, the same symbols are used and the explanation is omitted.

As shown in FIG. 6, in this embodiment, instead of the resin press felt 44 of the first embodiment, a hard pad 64 is disposed as a guide means which is harder than the main portion 36A of the seat pad 36, and instead of the resin press felt 46 of the first embodiment, a hard pad 66 is disposed as a supplemental guide means which is harder than the side portion 36B of the seat pad 36.

Therefore, the same effects as in the first embodiment can also be obtained in this embodiment. Furthermore, because the guide means is the hard pad 64 and the supplemental guide means is the hard pad 66, manufacturing can be easily performed and cost can be lower.

Figure 7:
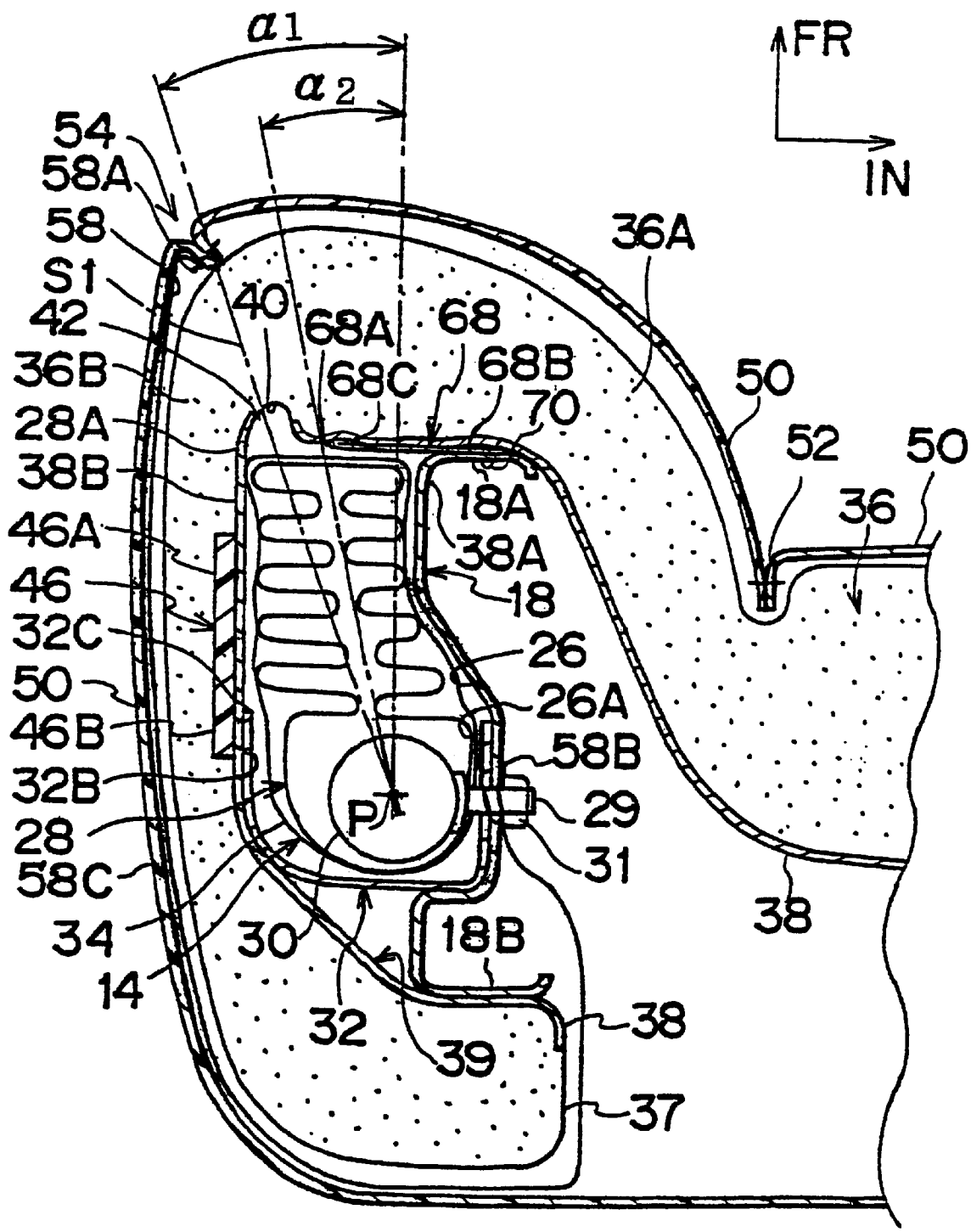
FIG. 7 is a cross-sectional view corresponding to FIG. 1 showing a vehicle seat housing an airbag device related to a third embodiment of this invention.

Next, a third embodiment of a vehicle seat housing an airbag device of this invention is explained in accordance with FIG. 7.

With respect to members that are the same as in the first embodiment, the same symbols are used and the explanation is omitted.

As shown in FIG. 7, in this embodiment, instead of the resin press felt 44 of the first embodiment, a deformable plate 68 made of a plate member such as a metal, resin, or the like is disposed as a guide means. A door side end portion 68A of the plate 68 is bent toward the front of the vehicle, and when the airbag pouch body 28 contacts the plate 68, the airbag pouch body 28 does not contact the plate member cut portion 68C of the plate 68. The vehicle width direction inside portion 68B of the plate 68 overlaps the flange 1 8A of the side frame 18 by a predetermined amount and is fixed to the flange 18A of the side frame 18 by a fixing means 70 such as a screw(s) or the like.

Therefore, the same effect as in the first embodiment can be obtained in this embodiment. Furthermore, the expansion direction of the airbag pouch body 28 can be easily adjusted by the material and plate thickness of the plate 68.

Figure 8:
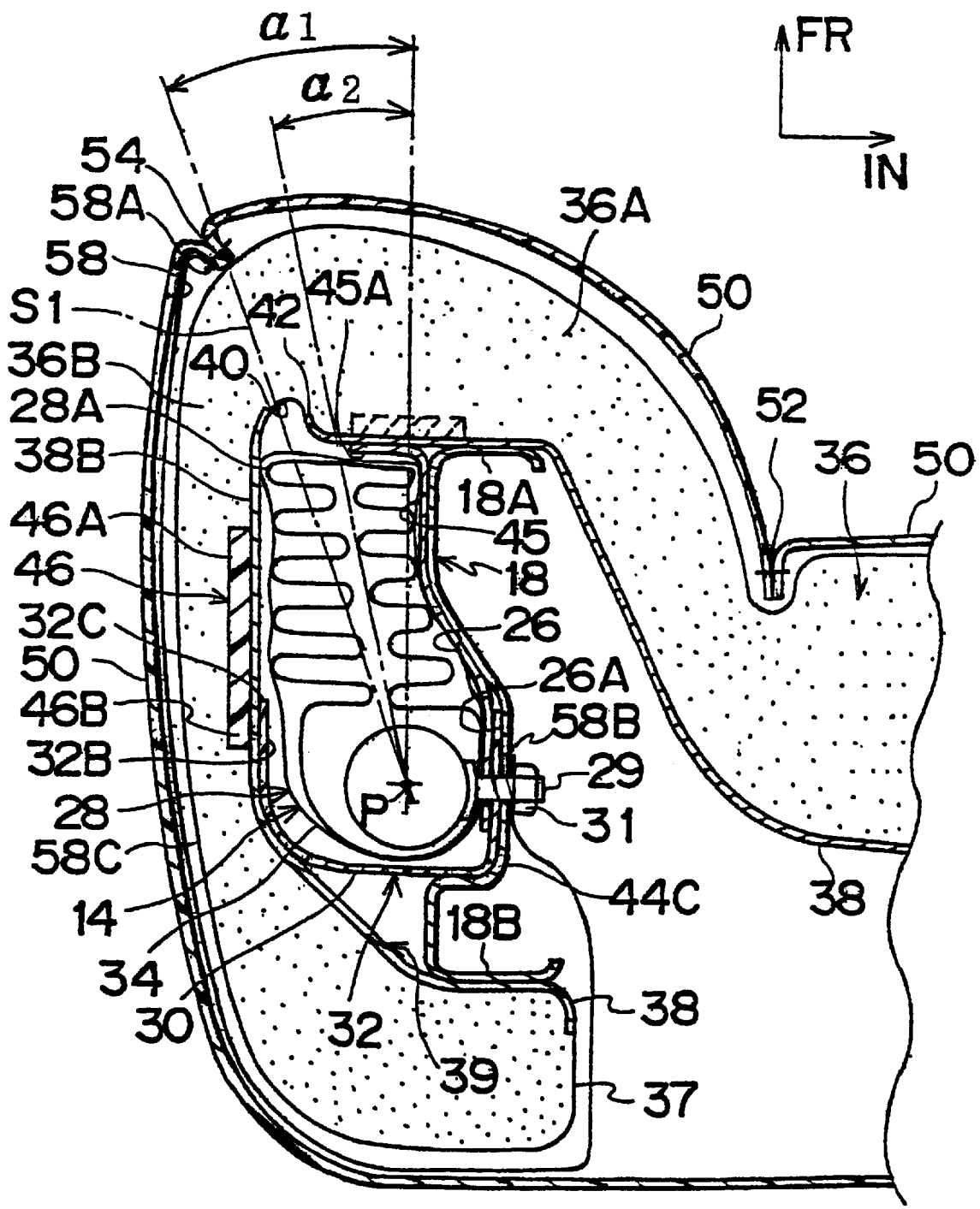
FIG. 8 is a cross-sectional view corresponding to FIG. 1 showing a vehicle seat housing an airbag device related to a fourth embodiment of this invention.

Next, a fourth embodiment of a vehicle seat housing an airbag device of this invention is explained in accordance with FIG. 8.

Furthermore, with respect to members that arc the same as in the first embodiment the same symbols are used and the explanation is omitted.

As shown in FIG. 8, in this embodiment, instead of the resin press felt 44 of the first embodiment, a plate 45 is disposed on an airbag pouch body 28 side of the felt 38. The plate 45 extends backward along the side frame 18, and a rear end portion 44C of the plate 45 is tightened together with the door side surface of the inflator housing portion 26A by the bolts 29 and the nuts 31. The door side portion 45A of the plate 45 is extended so as to lie in substantially the same plane as the flange 18A of the side frame 18. During expansion of the airbag pouch body 28, the airbag pouch body 28 contacts the door side portion 45A of the plate, and the door side portion 45A is deformed by expansion pressure of the airbag pouch body 28. Furthermore, the plate 45 is constituted by a deformable plate member such as a resin, metal, or the like.

Therefore, the same effects as in the first embodiment can also be obtained in this embodiment. Furthermore, the expansion direction of the airbag pouch body 28 can be easily adjusted by the material and the plate thickness of the resin plate 45. Furthermore, because the resin plate 45 is fixed to the side frame 18 by the bolts 29 and the nuts 31 that fix the inflator 30 to the side frame 18, manufacturing can be easily performed and the cost can be lower because the resin plate 45 can be simply added to a conventional seat structure.

Figure 9:
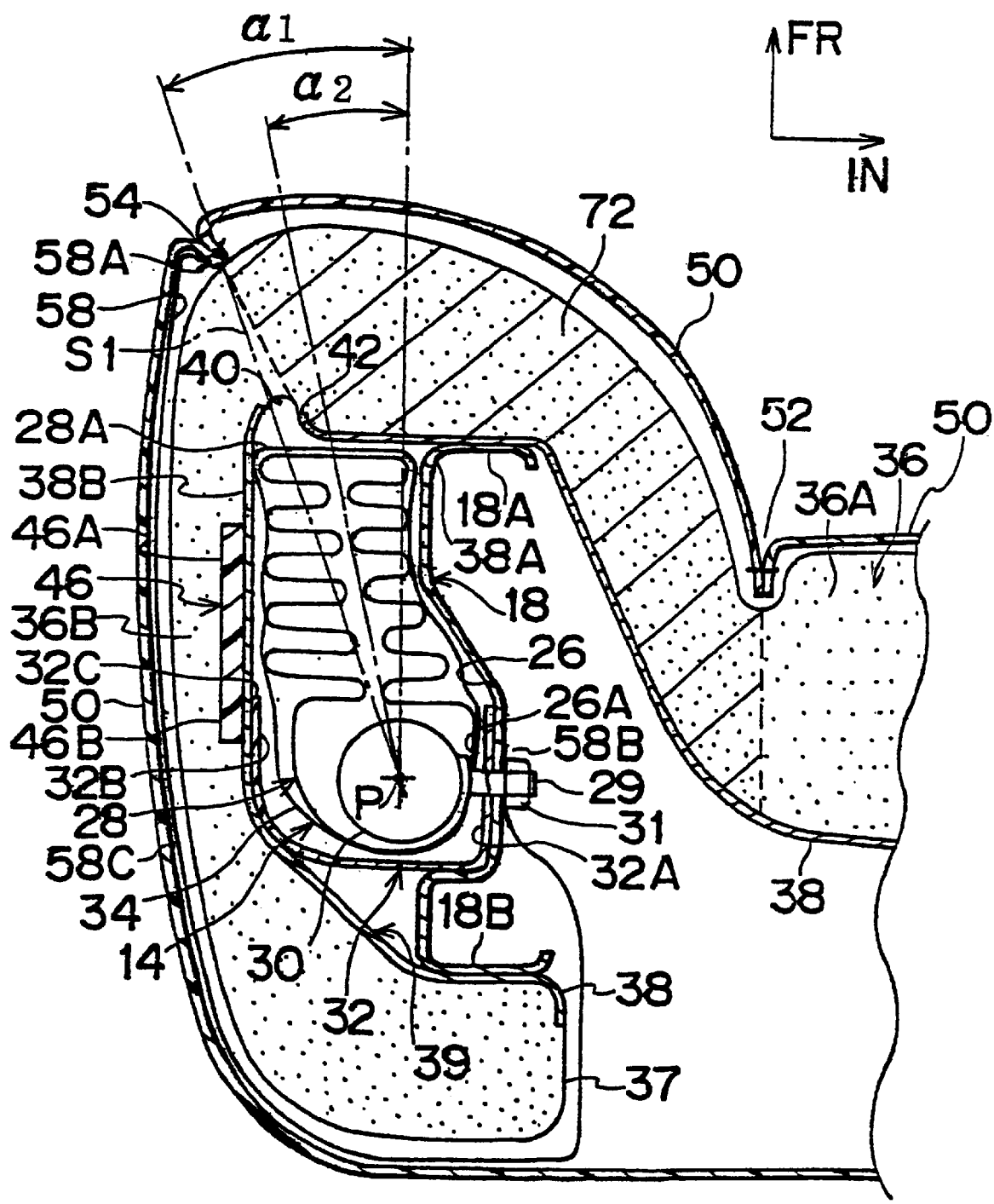
FIG. 9 is a cross-sectional view corresponding to FIG. 1 showing a vehicle seat housing an airbag device related to a fifth embodiment of this invention.
Figure 10:
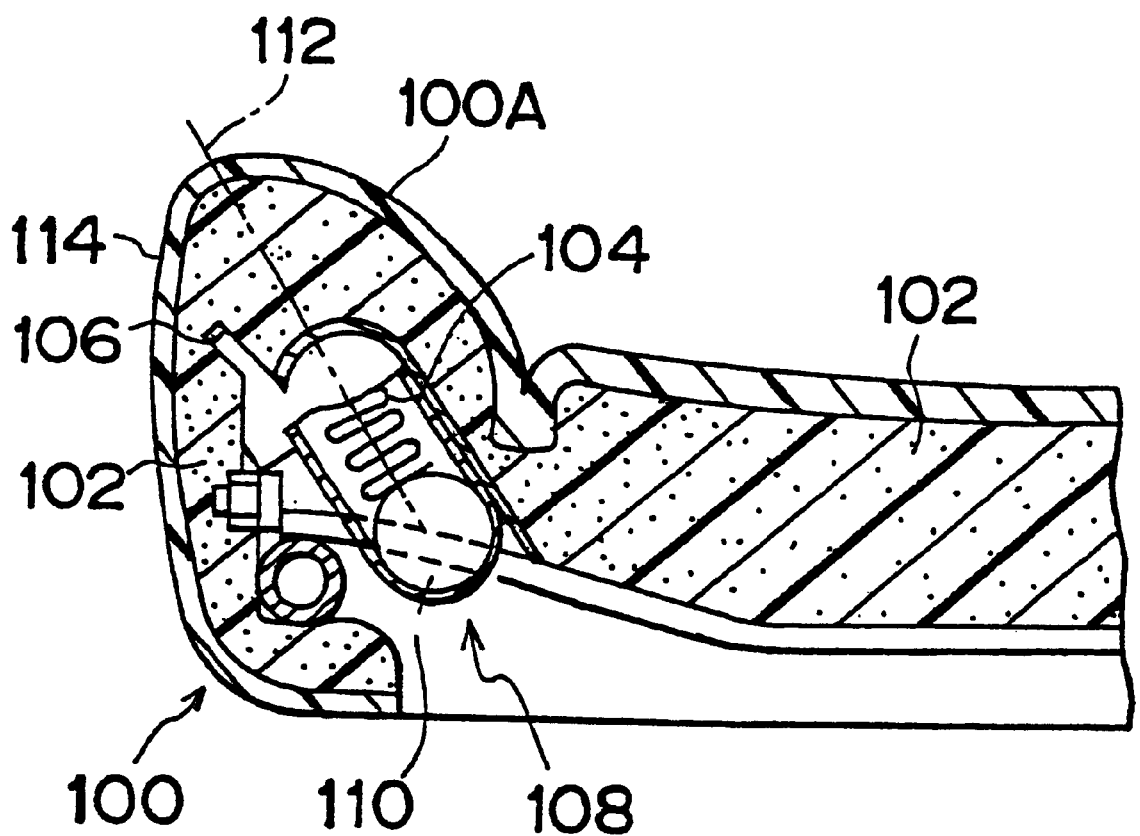
FIG. 10 is a cross-sectional view corresponding to FIG. 1 showing a conventional vehicle seat housing an airbag device.

Next, a fifth embodiment of a vehicle seat housing an airbag device of the invention is explained in accordance with FIG. 9.

Furthermore, with respect to members that are the same as in the first embodiments, the same symbols are used and the explanation is omitted.

As shown in FIG. 9, in this embodiment, instead of the resin press felt 44 of the first embodiment, a portion (the portion which is shown by hatching in FIG. 9) which is positioned on the side of the pain S1 connecting the axis P of the inflator 30 of the airbag, device 14 and the breakage sewn portion 54 of the seat surface covering 50 that is closer to tile center of the seat (right side of FIG. 9) at an airbag, pouch body expansion area is structured by a hard pad 72 which is harder than other main portion 36A of the pad 36 and the side portion 36B.

Therefore, in the same manner as in the first embodiment, energy loss can be prevented during expansion of the airbag pouch body by the hard pad 72 positioned at the airbag pouch body expansion area. Pressure can be focused on the sewn portion 54 as a breakage sewn portion of the seat surface covering 50, and by breaking it instantaneously, the expansion speed of the airbag pouch body 28 can be improved. Furthermore, the hard pad 72 can be further deformed by expansion pressure of the airbag pouch body 28, so the airbag pouch body 28 can be expanded in the direction between the vehicle main body side portion and the vehicle occupant side portion in the same manner as in the first embodiment. Therefore, the time until the expansion of the airbag pouch body 28 is completed can be speeded up. In addition, the ability of the scat back to support the vehicle occupant can be improved by the hard pad 72.

This invention is explained in detail with respect to specified embodiments as described above, but this invention is not limited to the above-mentioned embodiments, and various embodiments within the scope of the claims of this invention can be performed by a person skilled in the art. For example, in the above-mentioned embodiments, a supplemental guide means made of a resin press felt 46 or a hard pad 66 is disposed, but a structure without a supplemental guide means can also be used. In addition, the folded shape of the airbag pouch body 28 is not limited to the folded shape of the above-mentioned embodiments, but other folded shapes such as cactus folding and rolled folding can also be used. Furthermore, the means to maintain the folded shape of the airbag pouch body 28 is not limited to the wrapping member 34 of the above-mentioned embodiments, but other shape maintaining members such as a belt can also be used. Paper material can also be used for the wrappings member 34 in addition to a cloth bag. Furthermore, as shown in the above-mentioned embodiment, a seat pad of this invention can be structured without a felt 38, instead of having a structure in which a felt 38 is disposed in a seat interior surface of the seat pad 36.

Additionally, this invention has a seat with a caseless airbag device, and does not use a conventional airbag case, but this invention is not limited to this. In a seat with an airbag device with a case, as an airbag pouch body contacts a seat pad during the expansion, as long as the seat allows a seat pad to expand and break, the same effects as in the above-mentioned embodiments can be obtained. Because of this, this invention can also be applied to a seat with an airbag device with a case.

What is claimed is:

1. A vehicle seat housing an airbag device fixed to a door side portion of a seat back side frame in a concave portion of a seat pad which is open to a rear side of a vehicle and covered by a seat surface covering, the vehicle seat comprising:

guide means disposed on an airbag side of the seat pad, the guide means being positioned on a side of a plane connecting an axis of an inflator of the airbag device and a breakage sewn portion of the seat surface covering that is closer to a center of the seat, at an airbag pouch body expansion area, the guide means being harder than a main portion of the seat pad, the guide means being deformed by expansion pressure of the airbag pouch body and guiding an airbag pouch body in a predetermined direction, and the seat pad continuously covering a front side of the airbag pouch body; and a concave portion formed in a portion of the seat pad near a door side front end portion of the airbag pouch body, the concave portion being defined by a concave surface facing inwardly of the seat pad, wherein the axis of the inflator, the breakage sewn portion of the seat portion and the concave portion lying on said plane and the guide means is disposed closer to the center of the seat than said plane.

2. The vehicle seat as set forth in claim 1,
wherein the guide means comprises resin press felt.

3. The vehicle seat as set forth in claim 1,
wherein the guide means comprises a hard pad which is harder than a main portion of the seat pad.

4. The vehicle seat as set forth in claim 1,
wherein the guide means extends to an inward position in a seat width direction which overlaps a front end portion of the seat back side frame by a predetermined amount.

5. The vehicle seat as set forth in claim 1, further comprising:

supplemental guide means disposed at an inward surface in the seat pad facing a door side portion of the airbag device, the supplemental guide means being harder than the main portion of the seat pad, and being deformable by expansion pressure of the airbag pouch body.

6. The vehicle seat as set forth in claim 5,
wherein the supplemental guide means extends to a rear position which overlaps a protector, which is fixed to a door side portion of the seat back side frame and maintains an expansion space of the airbag pouch body during a side collision, by a predetermined amount.

7. The vehicle seat as set forth in claim 1,
wherein the airbag device is a caseless airbag, device.

8. The vehicle seat as set forth in claim 1, wherein the seat back side frame comprises a flange that faces in a substantially forward direction of the vehicle, the guide means being substantially parallel with the flange.

9. A vehicle seat housing an airbag device fixed to a door side portion of a seat back side frame in a concave portion of a seat pad which is open to a rear side of a vehicle and covered by a seat surface covering, the vehicle seat comprising:

guide means having a first side and a second side opposite the first side, a portion of the first side facing the seat back side frame and the second side facing the seat pad, the guide means being positioned on a side of a plane connecting an axis of an inflator of the airbag device and a breakage sewn portion of the seat surface covering that is closer to a center of the seat, at an airbag pouch body expansion area, the guide means being harder than a main portion of the seat pad, the guide means being deformed by expansion pressure of the airbag pouch body and guiding an airbag pouch body in a predetermined direction, and the seat pad continuously covering a front side of the airbag pouch body; and a concave portion formed in a portion of the seat pad near a door side front end portion of the airbag pouch body, the concave portion being defined by a concave surface facing inwardly of the scat pad, wherein the axis of the inflator, the breakage sewn portion of the seat portion and the concave portion lying on said plane and the guide means is disposed closer to the center of the seat than said plane.

10. The vehicle seat as set forth in claim 9,
wherein the guide means is a deformable plate, one end portion of which is fixed to a front end portion of the seat back frame.

11. The vehicle seat as set forth in claim 9,
wherein the guide means is a deformable plate, one end portion of which is fixed to a side surface portion of the seat back frame.

12. The vehicle seat as set forth in claim 9,
wherein the guide means extends to an inside position in the seat width direction which overlaps the front end portion of the seat back side frame by a predetermined amount.

13. The vehicle seat as set forth in claim 9, further comprising:

supplemental guide means disposed at an inward surface in the seat pad facing a door side portion of the airbag device, the supplemental guide means being harder than the main portion of the seat pad, and being deformable by expansion pressure of the airbag pouch body.

14. The vehicle seat as set forth in claim 13,
wherein the supplemental guide means extends to a rear position which overlaps a protector, which is fixed to a door side portion of the seat back side frame and maintains an expansion space of tile airbag pouch body during a side collision, by a predetermined amount.

15. The vehicle scat as set forth in claim 9,
wherein the airbag device is a caseless airbag device.

16. The vehicle seat as set forth in claim 9, wherein the seat back side frame comprises a flange that faces in a substantially forward direction of the vehicle, the guide means being substantially parallel with the flange.

17. The vehicle seat as set forth in claim 9, wherein the guide means is disposed on an airbag side of the seat pad.

* * * * *